United States Patent [19]
Geerts

[11] Patent Number: 5,181,597
[45] Date of Patent: Jan. 26, 1993

[54] CONVEYOR- AND DISTRIBUTION PLANT

[75] Inventor: Jan C. Geerts, Heemskerk, Netherlands

[73] Assignee: Promech Sorting Systems B.V., Netherlands

[21] Appl. No.: 823,661

[22] Filed: Jan. 21, 1992

[30] Foreign Application Priority Data

Jan. 23, 1991 [NL] Netherlands ............... 9100108

[51] Int. Cl.$^5$ .................................... B65G 47/46
[52] U.S. Cl. .................. 198/365; 198/477.1; 198/802
[58] Field of Search ........... 198/365, 477.1, 706, 198/802

[56] References Cited

U.S. PATENT DOCUMENTS

| 4,569,434 | 2/1986 | Horii et al. | 198/802 |
| 4,763,771 | 8/1988 | Geerts | 198/365 |
| 5,090,552 | 2/1992 | Fukuyama et al. | 198/365 |

FOREIGN PATENT DOCUMENTS 252520  12/1985  Japan .................. 198/365

Primary Examiner—Joseph E. Valenza
Attorney, Agent, or Firm—Lalos & Keegan

[57] ABSTRACT

Endless conveyor comprising a plurality of inter-connected conveyor units (1) spaced from each other and traveling in a mainly horizontal circuit, each unit being provided with a carrying surface (7) directed outwardly with respect to said conveying circuit. Each surface can assume two positions as a result of a tilting movement about an axis (9) lying parallel to the circuit: a virtually horizontal conveying position (B) and a downwardly inclined discharge position (A). There is a rod system (17-28) and a damping element (16) for regulation of the speed with which each surface (7) is moving by gravity from the horizontal conveying position (B) towards the discharge position (A).

7 Claims, 4 Drawing Sheets

FIG:2.

CONVEYOR- AND DISTRIBUTION PLANT

The invention relates to a plant for transporting and discharging a load, comprising an endless conveyor which passes along a frame through a closed track circuit, and which is provided with at least one carrying surface for the load, which surface lies at right angles to the track circuit, while each carrying surface is movably supported in such a way that a displacement is possible between an essentially horizontally directed conveying position and a discharge position, for which purpose each carrying surface in the conveying position interacts with a locking mechanism and on reaching the discharge position each carrying surface can interact with a discharge station and later with a return device, as known from the European publication EP 0,234,653.

Such a plant is often used for sorting objects which are fed in after one another and which have to be delivered to a correct place, with or without a selected number of other objects. In the known plant mentioned above, use is made of the force of gravity for generating energy with which the object (the load) is deposited in an intended discharge station. In this case a facility working with a computer for bringing about selective discharge is generally used, so that the objects fed in are discharged in the destination stations. The carrying surface used here comprises an endless belt which is driven at the correct time for lateral discharge of the load.

In this connection reference can also be made to Patent Application NL 7,305,636, which relates to a similar plant, and in which a carrying surface for the load is used in the form of a split container. The bottom of said container is composed of two halves which tilt away downwards in order in this way to drop the load into the intended station. It has, however, been found through experience that in both of the plants described above the load is sometimes discharged with insufficient care, particularly if the load is made up of folded garments, the appearance of which is damaged.

The object of the invention is therefore to provide a plant in which the discharge of the load takes place with the exertion of the smallest possible forces on the objects concerned. This object is achieved according to the invention through the fact that each carrying surface is hingedly supported between the conveying position and the discharge position, the hinge pin lying essentially parallel (tangential) to the track circuit, and through the fact that the speed of the downward flapping, pivoting movement of each carrying surface between the conveying position and the discharge position is controlled by means of a damping element.

Through these measures the objects undergo a gradually sliding movement, as a result of which even fragile and breakable objects can be selected. This includes not only lightweight garments, but also cosmetics, compact discs, shoes and similar goods. What is important in this connection is that during discharge the objects remain in contact with the carrying surface and reach the discharge station in a sliding or gliding movement. It is pointed out that in principle the means for influencing both the tilting speed and the tilting angle of the carrying surface can be incorporated in the hinged support of said bearing surface.

In a preferred embodiment of the plant according to the invention the adjustable means for determining the lie of the discharge position and of the conveying position act directly upon the hinged carrying surface.

In a known manner the plant can be designed in such a way that each carrying surface forms part of a conveyor unit provided with a rear plate and a trolley which interacts with the frame and with the endless conveyor. In such an embodiment the hinge pin of each carrying surface according to the invention is fitted on the rear plate of the corresponding conveyor unit.

In an advantageous embodiment of the plant according to the invention the damping element is connected by at least one rod to the corresponding carrying surface, and said damping element is provided with the adjustable means for the lie of both end positions of the carrying surface. In this case the connecting rod of each surface can be fixed with its top end hinged against the underside of the carrying surface concerned, and with its lower end also pivotally secured to a sliding pin which is mounted so that it can be moved upwards and downwards along the rear plate of the conveyor unit, which pin is coupled directly to the damping element.

The invention will be explained in greater detail with reference to the drawing, which shows an embodiment and some details of the plant according to the invention.

Figure 1:
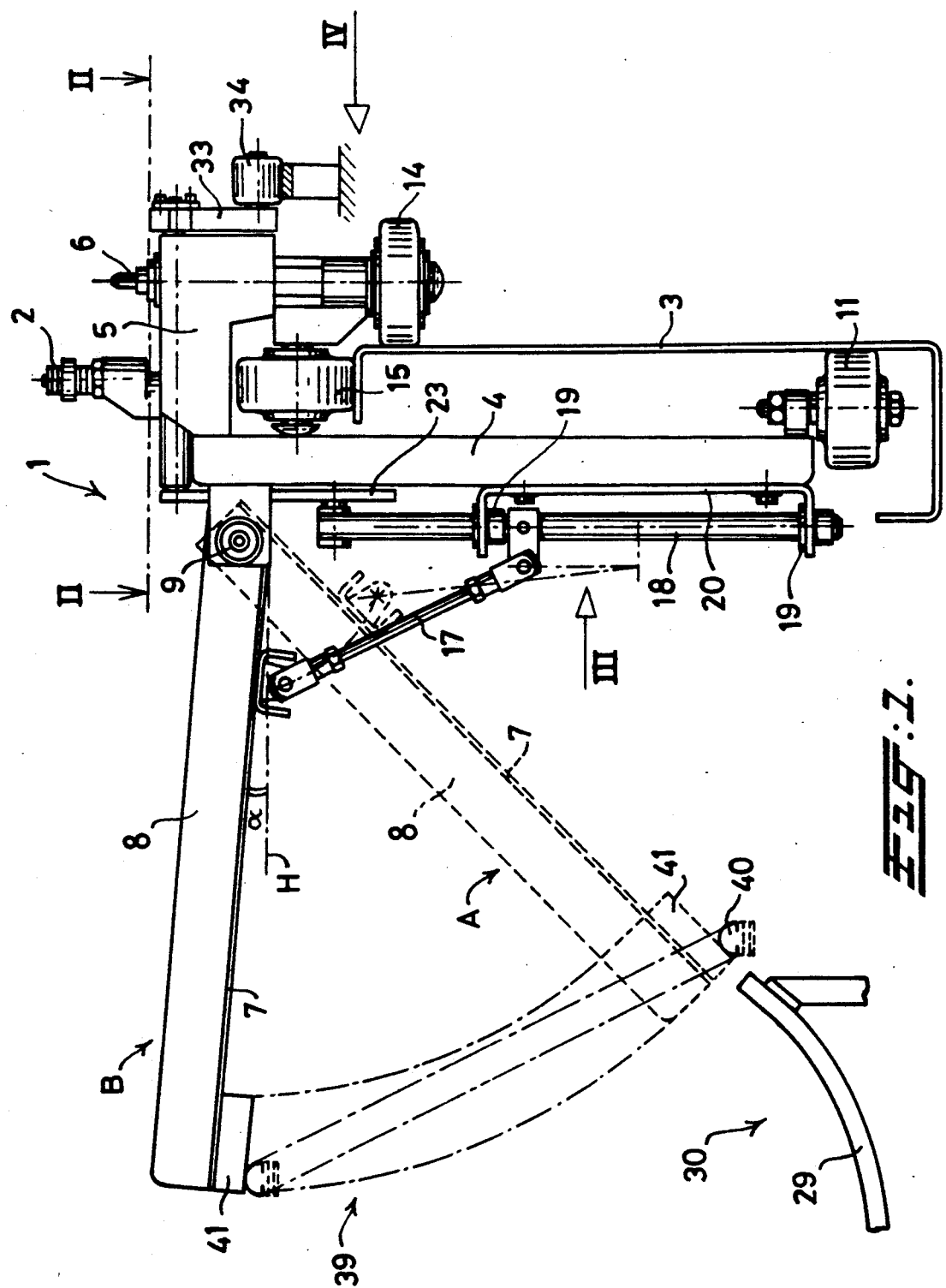
FIG. 1 is a side view of a conveyor unit from said plant.

The drawing shows a single conveyor unit 1, a large number of which are used in the whole plant, as can be seen clearly from the first figure of the above-mentioned state of the art EP-A-0,234,653, which plant is provided with an endless conveyor 2 (see FIGS. 1 and 4) which runs along a frame 3 through a closed track circuit. The conveyor unit 1 is provided with a rear plate 4 and a trolley 5. Said trolley rests on the frame 3 by means of supporting rollers to be mentioned below. The trolley is moved forward through the fact that a number of coupling pins 6 are present on the top of the trolley (see FIG. 4), which pins can interact with the endless conveyor 2 in the form of a chain.

Figure 2:
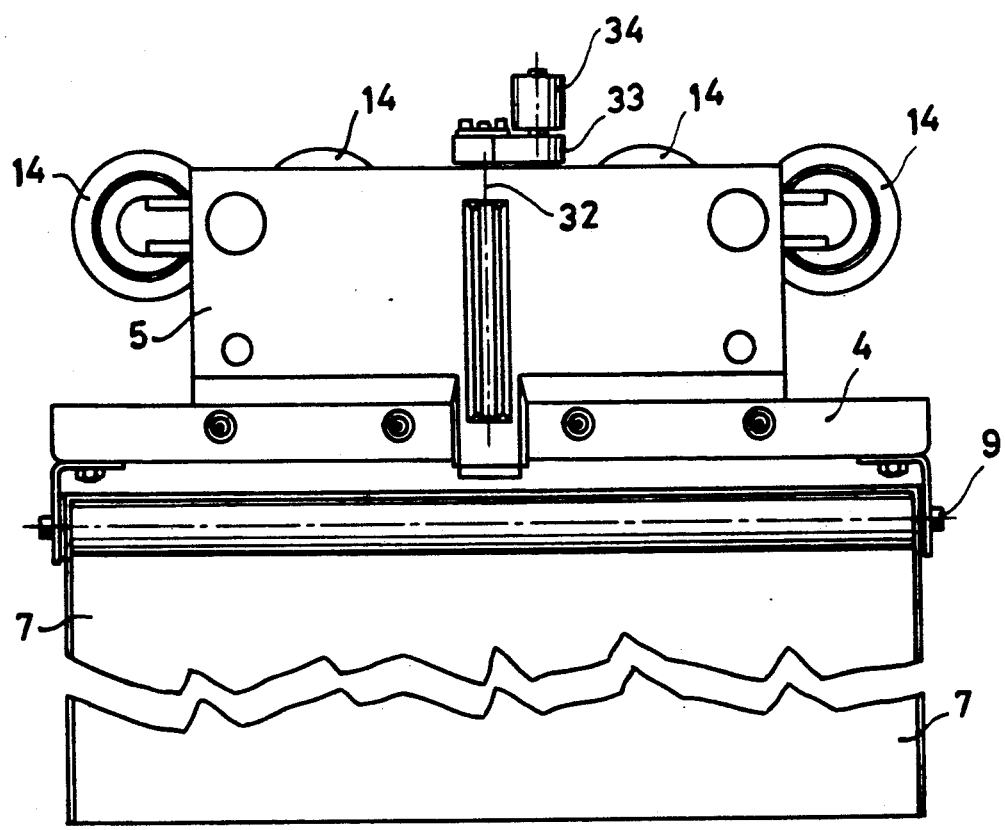
FIG. 2 is a top view along the line II—II of FIG. 1.

Each conveyor unit 1 is provided with a carrying surface 7 which lies at right angles to the track circuit and is composed of a rectangular plate (see FIG. 2) with upright sides 8. Each surface 7 is hingedly supported, the hinge pin 9 lying essentially parallel to the track circuit formed by the conveyor 2. In the curved track parts the hinge pin lies tangential to said parts.

FIG. 1 shows the surface 7 by solid lines in its conveying position B, in which said surface assumes a slightly upward slanting position enclosing as seen from the hinge pin 9, a positive angle α of the order of 5°–10° relative to the horizontal H. The carrying surface 7 is hingedly supported to a limited extent and can move between the conveying position B and the discharge position A shown by dashed lines in FIG. 1. The surface 7 is held in its conveying position B by means of a locking mechanism 10 which also forms part of the conveyor unit 1. Each unit 1 is provided with a bearing and guide structure 11-15 interacting with the frame 3.

Two supporting rollers 11 which rest against the inside of the frame 3 are present on the underside of the rear plate 4. Each trolley 5 is provided with a mounting plate 12 (see FIG. 4) in which two shackles 13 are rotatably mounted on either side of the centre. Two guide rollers 14 are rotatably mounted in each shackle 13, which rollers are in contact with the outside of the frame 3. The mounting plate 12 is also provided with two travelling rollers 15 which rest on the upper side of the frame 3 and which bear the full weight of the conveyor unit 1.

Since the hinge pin 9 lies parallel or tangential to the track circuit of the conveyor 2, the pivoting movement of the plate 7 takes place in a plane at right angles to the rear plate 4.

Figure 3:
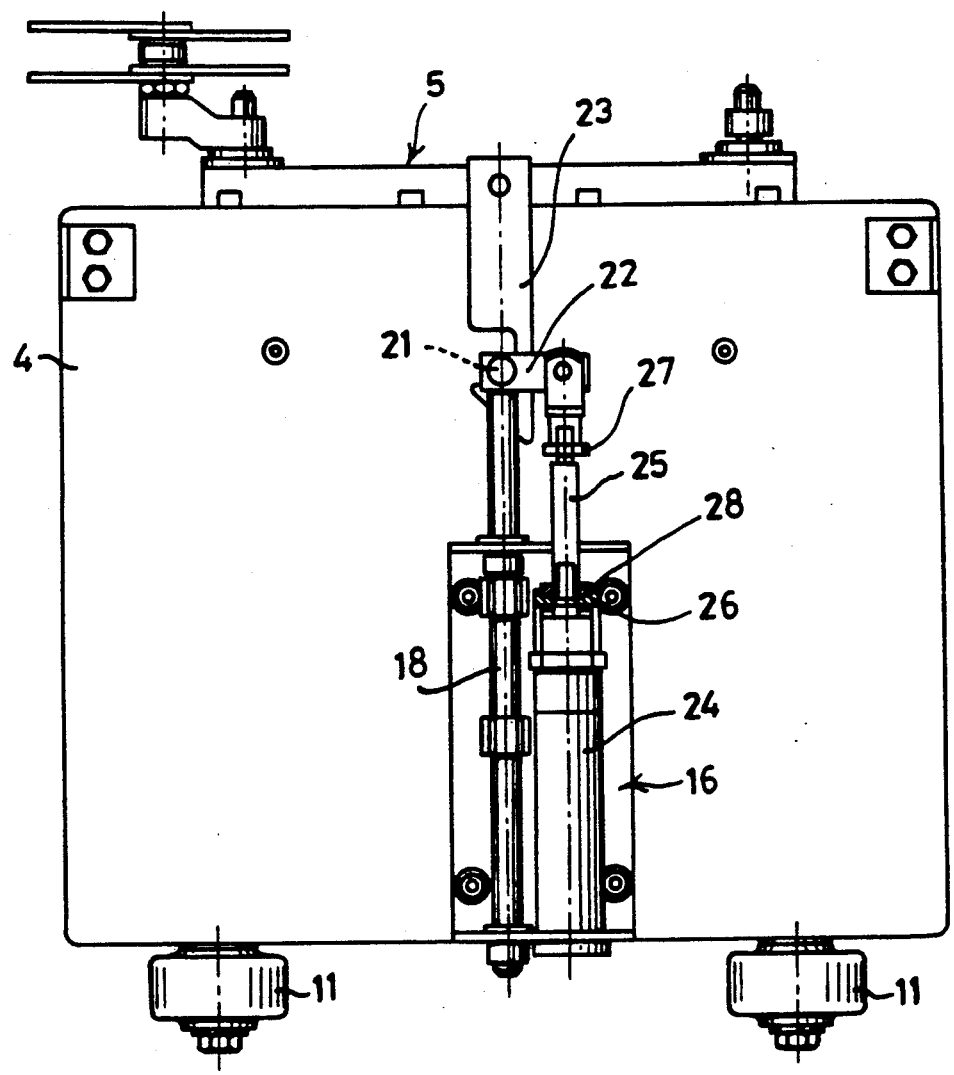
FIG. 3 is a view in the direction of the arrow III from the left side in FIG. 1.

The speed of the downward flapping pivoting movement of the carrying surface 7 between the conveying position B and the discharge position A is governed by means of a damping element 16, shown in FIG. 3. The connection between the surface 7 and this damping element 16 is formed by a rod 17 which is fixed with its top end hinged against the underside of the surface 7. The lower end of the connecting rod 17 is pivotally secured to a sliding pin 18 which is mounted so that it can move up and down along the rear plate 4 of the conveyor unit 1. This pin 18 is slidable in the bearings 19 provided in the flanged ends of a bracket 20 which is fixed on the rear plate 4. A cam roller 21 and a cross piece 22 are fitted at the top end of the sliding pin 18. The roller 21 rests in the situation shown in FIGS. 1, 3 and 4 in a locking hook 23 which forms part of the locking mechanism 10. The damping element 16 is formed by a pneumatic cylinder 24 with a piston rod 25 whose top end is fixed on the cross piece 22 of the sliding pin 18.

In the situation shown in FIGS. 1 and 3 a major part of the weight of the filled or unfilled carrying surface 7 is borne by the locking hook 23 via the connecting rod 17 and the sliding pin 18 with the roller 21. During the movement forward of the conveyor unit 1 along the closed track circuit formed by the frame 3, this situation is retained up to the moment that the locking mechanism 10 goes into action, i.e. until the locking is removed. In that case the connecting rod 17 will move the sliding pin 18 downwards, in which case the piston rod 25 is pressed by means of the cross piece 22 in the direction of the cylinder 24. The medium (generally air) inside the cylinder 24 can escape only through a throttle (not shown), so that the falling movement of the plate 7 is damped. In this way the surface 7 turns gently out of the conveying position B into the discharge position A.

The lie of the conveying position B of the carrying surface 7 is determined by the position of the cam roller 21 on the sliding pin 18. As already indicated earlier, this position B slants slightly upward at an angle α, in order to compensate for the centrifugal force occurring in the bends of the track circuit of the conveyor. The lie of the discharge position A of the surface 7 can be determined with the aid of adjustable means 26, comprising a stop nut 27 on the piston rod 25 and a stop ring 28 fitted with play around said piston rod, which ring is fixed on the rear plate 4. When determining this lie of the discharge position A it can be ensured that the surface 7 lies in line with a slanting trough 29 forming the discharge station 30. The objects present on the carrying surface 7 can then slide or glide gently into this trough 29 for further processing, or for transportation or delivery.

Figure 4:
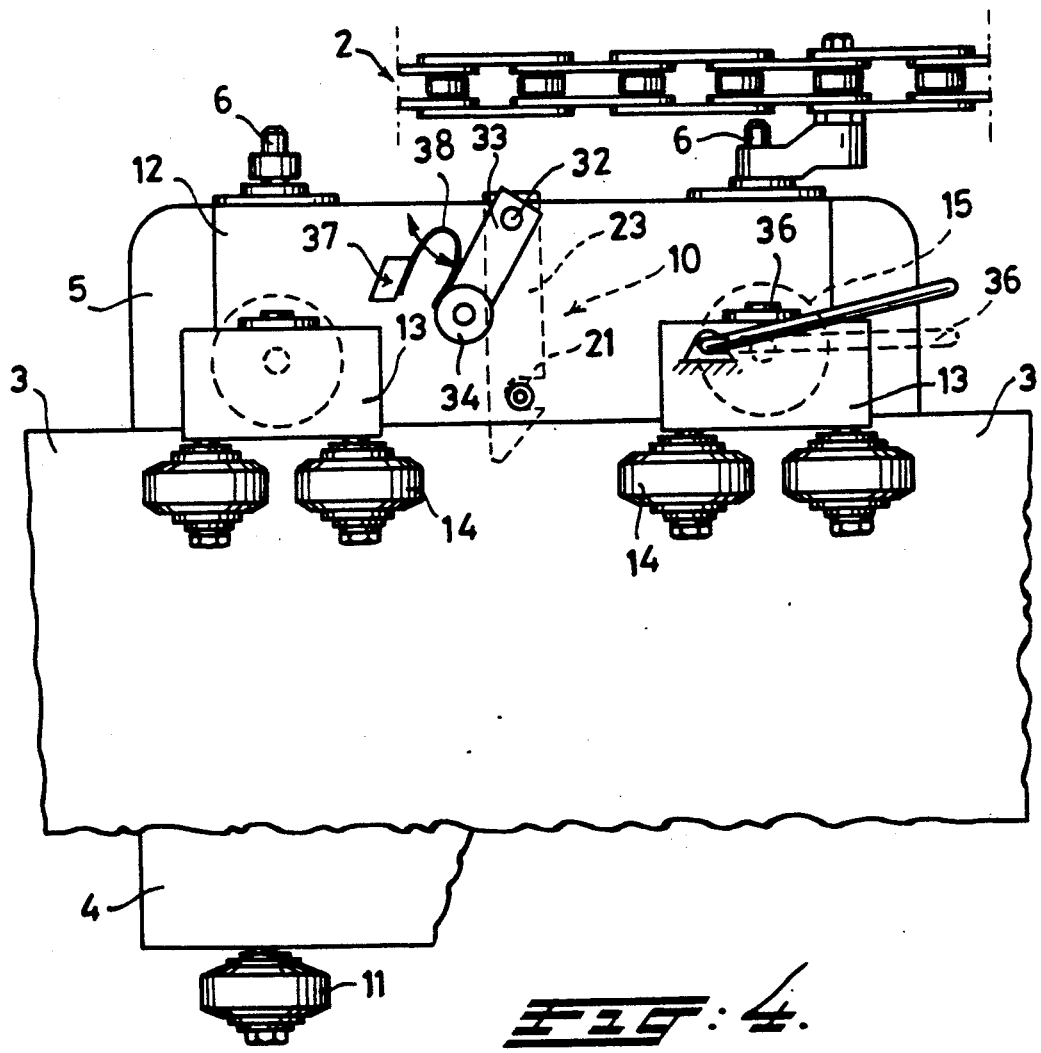
FIG. 4 is a view in the direction of the arrow IV from the right side of FIG. 1.
Figure 5:
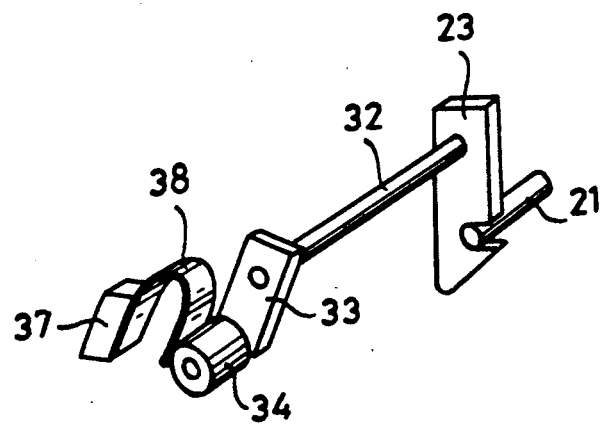
FIG. 5 is a detail of the locking mechanism from FIG. 4.

The locking mechanism 10, which is shown most clearly in FIGS. 4 and 5, comprises the locking hook 23 which is fixed on the end of a shaft 32 which coincides with the hinge pin 9 mentioned earlier. This shaft 32 is supported inside the trolley 5. A lever arm 33 with a roller 34 is fixed at the other end of the shaft 32. Each conveyor unit 1 is equipped with such a locking mechanism 10 in order in that way to permit a controlled falling movement of the carrying surface 7. Along the outside of the track circuit passed through by the conveyor units 1 are a number of discharge stations 30 (see FIG. 1) to which the load (the object or the objects) must go. For this, a movable cam 36 is provided on the fixed frame 3 of the plant at a place near each discharge station 30. This cam is normally situated in the horizontal position shown by dashed lines in FIG. 4, in which position no contact with the roller 34 occurs. The cam 36 can be placed in the slanting position by exciting an electromagnet (not shown). The signal required for this is given either by the computer used or in another way. The next conveyor unit which passes this slanting cam 36 receives from it an impulse through the fact that the roller 34 comes into contact with the cam 36. The shaft 32 with the locking hook 23 is turned by this, as a result of which the cam roller 21 is released. The bearing surface 7 can then move downwards under the influence of gravity. This movement then takes place slowed down through the action of the damping element 16. The lever arm 33 of the locking mechanism 10 can undergo only a limited turning on contact with the cam 36, due to the presence of the stop 37, while a spring 38 exerts pressure on the arm 33. Through this, the locking hook 23 will move back again to its vertical position shown in FIGS. 3 and 4 as soon as the roller 34 has passed said cam 36.

For the return of the carrying surface 7 from the discharge position A to the conveying position B, a return device 39 is present in a region along the track circuit past the discharge stations 30, said device comprising an upward sloping rail 40. A cam 41, which in the discharge position A can interact with said rail 40, is fitted at the underside of the surface 7. This means that on passing the return device 39 the surface is raised to such an extent that by means of the connecting rod (17) and the sliding pin 18 the cam roller 21 snaps into the locking hook 23. The conveyor unit concerned is thus ready again for receiving new objects, following which the cycle can be repeated.

I claim:

1. A conveyor in a plant for transporting and discharging a load, in which said plant includes a frame, a closed track circuit and an endless conveyor which passes along said frame through said closed track circuit, said conveyor comprising:

at lest one carrying surface (7) for said load;

a hinge pin (9) for hingedly supporting said carrying surface for pivotal movement of said surface between an essentially horizontally directed conveying position (B) and a discharge position (A);

a locking mechanism (23) releasably locking said carrying surface in said conveying positions (B);

said carrying surface forming part of a conveyor unit (1), said conveyor unit (1) including a main back plate (4) and trolley rollers (11, 14, 15) for moving along a frame (3) by means of an endless conveyor (2), said hinge pin (9) of said carrying surface (7) being mounted on said back plate (4) of said conveyor unit (1);

means (26) for adjusting the discharge position (A) of said carrying surface (7); and a damping element (16) for controlling the speed of pivotal movement of said carrying surface (7) from said conveying position (B) to sad discharge position (A).

2. A conveyor according to claim 1 further comprising at lest one rod (17) for connecting said carrying surface (7) to said damping element (16).

3. A conveyor according to claim 2 including means for pivotally mounting a top end of said connecting rod (17) to an underside of said conveying surface;
   a sliding pine (18) and means for movably mounting said sliding pin to said back plate (4) for up and down movement along said back plate;
   means for coupling said sliding pin directly to said damping element (16); and
   means for pivotally mounting a bottom end of said connecting rod (17) to said sliding pin (18).

4. A conveyor according to claim 1 wherein said damping element (16) comprises a cylinder (24) and a piston rod (25), and means for mounting said damping element on said back plate (4) next to said sliding pin (18);
   said adjusting means (26) comprising a stop nut (27) on said piston rod and a stop ring (28) which is fitted with play around said piston rod, and means for fixing said stop ring on said back plate (4).

5. A conveyor according to claim 4 wherein said carrying surface includes a cam (41) on the underside of said carrying surface for interaction with a return device (39).

6. A conveyor according to claim 4 wherein said means for adjusting (26) includes means for adjusting said discharge position (A) to align with a slanting trough (29) of a discharge station (30).

7. A conveyor according to claim 1 including means for adjusting the conveying position (B) to assume a slightly upward sloping position as seen from hinge pin (9) and encompassing a positive angle in the range of 5-10 degrees relative to a horizontal (H).

* * * * *